United States Patent [19]

Stumpe

[11] Patent Number: 5,588,716
[45] Date of Patent: Dec. 31, 1996

[54] METHOD AND DEVICE FOR ELECTRONICALLY CONTROLLING THE BRAKE SYSTEM OF A VEHICLE

[75] Inventor: Werner Stumpe, Stuttgart, Germany

[73] Assignee: Robert Bosch GmbH, Stuttgart, Germany

[21] Appl. No.: 548,025

[22] Filed: Oct. 25, 1995

[30] Foreign Application Priority Data

Oct. 26, 1994 [DE] Germany ............... 44 38 252.9

[51] Int. Cl.$^6$ .............. B60T 8/18; B60T 13/66
[52] U.S. Cl. .............. 303/7; 303/15; 303/22.1; 303/123; 303/166; 303/DIG. 3; 303/198
[58] Field of Search .................. 303/7, 15, 16, 303/17, 18, 20, 9.62, 123, 124, 166, DIG. 3, DIG. 4, 155, 198, 22.1, 22.8; 188/112 R, 112 A, 195

[56] References Cited

U.S. PATENT DOCUMENTS

| | | | |
|---|---|---|---|
| 4,685,745 | 8/1987 | Reinecke | 303/100 |
| 5,295,736 | 3/1994 | Brearley | 303/123 |
| 5,333,940 | 8/1994 | Töpfer | 303/7 |
| 5,344,222 | 9/1994 | Helldörfer | 303/100 |

FOREIGN PATENT DOCUMENTS 3901270  7/1990  Germany.

OTHER PUBLICATIONS

Automobil–Industrie (1989) No. 2, p. 161.

Primary Examiner—Douglas C. Butler
Attorney, Agent, or Firm—Felfe & Lynch

[57] ABSTRACT

A method and a device for electronically controlling or adjusting a brake system of a vehicle is proposed, in which brake system the characteristic braking curve of the trailer is adapted to a prescribed characteristic braking curve of the towing vehicle, in order to minimize the longitudinal forces between a towing vehicle and a trailer during a braking process, in such a way that the braking of the entire road train takes place in accordance with the prescribed characteristic braking curve of the towing vehicle.

14 Claims, 5 Drawing Sheets

METHOD AND DEVICE FOR ELECTRONICALLY CONTROLLING THE BRAKE SYSTEM OF A VEHICLE

PRIOR ART

The invention relates to a method and a device for electronically controlling the brake system of a vehicle.

U.S. Pat. No. 5,344,222 describes the determination of characteristic braking values for optimizing the electronic control of the brake system and thus of the braking process, the intention being in particular to minimize, or at least reduce, longitudinal forces in a road train with towing vehicle and trailer. For this purpose, at various measurement time intervals with different braking pressure distribution, the effective braking pressure is determined at the respective axles of the road train and the inertia force of the road train is determined from the braking deceleration and overall mass of the road train. The characteristic braking value is then identified, as a ratio of the braking force which can be achieved at the tire contact point and the braking pressure in the brake cylinders, by equating the calculated inertia force and the sum of the braking forces and taken into account during the control of the brake system in terms of minimizing or reducing the longitudinal forces in the road train. In this costly procedure, in order to optimize the braking process in terms of minimizing or reducing the longitudinal forces in a road train, three measurement time intervals with different braking pressure distribution are necessary, during which braking pressure distribution the braking forces both of the trailer and in the region of the towing vehicle are used. Optimization matched specifically to the trailer with the possibility of rapid and accurate adaptive correction of the control or adjustment of the brake system in terms of reducing or minimizing the longitudinal forces between the towing vehicle and trailer is not achieved.

Therefore, it is the object of the invention to disclose measures for minimizing or reducing the longitudinal forces between a towing vehicle and a trailer, which measures do not have the abovementioned disadvantages.

SUMMARY OF THE INVENTION

The procedure according to the invention permits effective minimization or reduction of the longitudinal forces between the towing vehicle and trailer during the braking process. The correction method used here equates the deceleration of the trailer to the deceleration of the towing vehicle, an adaptation of the control during the travel mode being made possible in a simple way.

At the same time, the correction method used is advantageously aimed at adapting the braking of the trailer. It is not necessary to detect the braking behavior of the towing vehicle.

It is particularly advantageous that the individual load state of the towing vehicle is also taken into account within the scope of the correction method.

The method can be particularly advantageously used both for drawbar-type road trains and semitrailer-type road trains as well as with changing road train compositions.

It is particularly advantageous that electronic signal processing is only required on the towing vehicle, so that a conventionally braked trailer can also be coupled on.

A particular advantage here is that sensors for detecting the coupling forces between towing vehicle and trailer can be dispensed with.

Further advantages can be gathered from the subsequent description of exemplary embodiments and from the dependent claims.

BRIEF DESCRIPTION OF THE DRAWING

FIG. 1$b$ is a schematic of a braking system for a towing vehicle according to a second embodiment;

FIG. 2$b$ illustrates the braking values of the towing vehicle and the braking values of the combined vehicle versus the brake signal e;

FIG. 2$c$ illustrates the correction of the braking signal to the trailer at operating points A, B, C in order to achieve the desired braking of the combined vehicle;

FIG. 2$d$ illustrates the correction of the characteristic braking curve of the trailer;

DESCRIPTION OF EXEMPLARY EMBODIMENTS

Figure 1A:
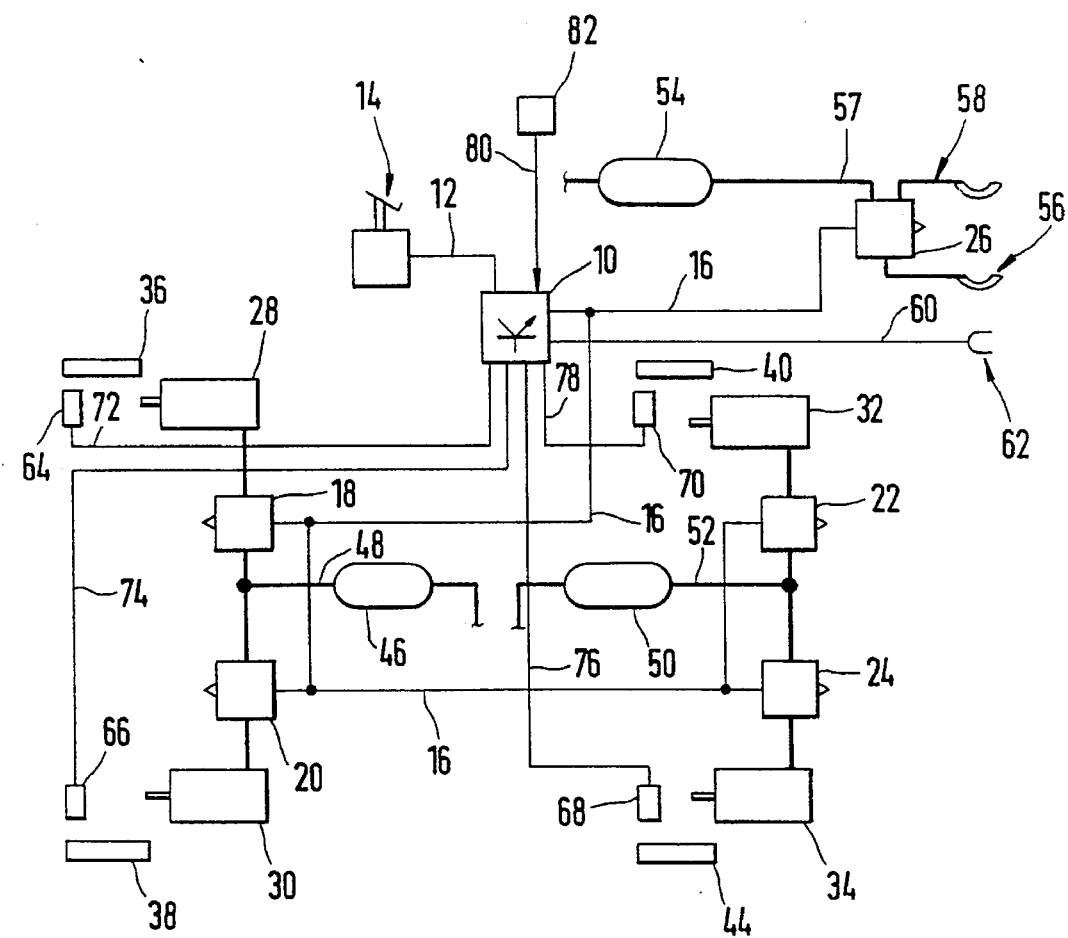
FIG. 1$a$ is a schematic of a braking system for a towing vehicle according to a first embodiment.

An electronically controlled or adjusted brake system of a vehicle is illustrated in FIG. 1$a$. Here, an electronic control unit 10 is provided, which is connected via a line 12 to a brake signal sensor 14 which can be activated by the driver. The electronic control unit 10 is connected to pressure control modules 18, 20, 22, 24 and 26 via a communication system 16. The pressure control modules 18, 20, 22 and 24 are each assigned to the brake cylinders 28, 30, 32 and 34 of four wheels or wheel groups 36, 38, 40 and 44 of a towing vehicle. The pressure control modules 18 and 20 control the pressure in the wheel brake cylinders 28 and 30 of the front wheels 36 and 38 of the towing vehicle, and the pressure control modules 22 and 24 control the pressure in the brake cylinders 32 and 34 of the rear wheels 40 and 44. Here, in each case the pressure medium is fed from reservoir vessels 46 and 50 via preferably pneumatic line systems 48 and 52 into the brake cylinders 28 and 30 as well as 32 and 34. The pressure control module 26 influences the pneumatic brake signal which is fed to the trailer via the coupling head 56, the pressure control module 26 being connected, by pneumatic line 57 to a reservoir vessel 54 and to the coupling head 58 for the pneumatic line of the trailer. The pressure control modules 18 to 26 also comprise measurement devices for detecting the: pressure in the wheel brake cylinders or in the pressure control module, the respectively detected measurement values being transmitted to the electronic control unit 10 via the communication system 16. In addition, an output line 60 of the electronic control unit 10 is provided, to the coupling head 62 for the electrical supply of the trailer and to transmit the electrical brake signal. Each wheel is assigned rotational speed sensors 64, 66, 68 and 70 which are connected via the lines 72, 74, 76 and 78 or, if appropriate, via the communication system 16, to the electronic control unit 10. Also leading to the control unit 10 is the line 80 which connects the control unit 10 to further measurement devices 82, for example for the axle load, the wear of the brakes and/or the temperature of the brakes.

In a preferred exemplary embodiment, a brake signal e is formed in the electronic control unit 10 as a function of the degree of activation of the brake signal sensor 14 or of its activation force, the brake signal e being converted by means of specifically adapted characteristic curves into a desired pressure signal for each wheel brake cylinder. During the braking process, the brake control modules 18, 20, 22, 24 feed the pressure into the assigned wheel brake cylinders in accordance with the desired pressure. Analogously, the electronic control unit 10 outputs, via the line 16, a desired value for the pressure in the wheel brake cylinders of the trailer, which pressure is fed in by the pressure control module 26. The latter outputs the pneumatic brake signal to the brake system of the trailer via the coupling head 56. If the trailer has a separate electronic control device for electronically controlling or adjusting its brake system, the electronic control unit 10 outputs to the electronic control unit of the trailer a measure of the desired pressure value or a measure of the brake signal e via the coupling head 62. The said control unit of the trailer adjusts the brake system of the trailer correspondingly.

In addition to the described adjustment of the brake pressure alone, in other advantageous exemplary embodiments an adjustment of the braking torque or the braking force may be superimposed.

The subsequently described procedure according to the invention can be applied not only in the electronically controlled or adjusted brake system described in FIG. 1a, but also advantageously in a conventional brake system with an ABS control unit. For this purpose, a brake system of this kind is extended with a pressure control in the trailer control valve. Such a brake system is illustrated in FIG. 1b.

Figure 1B:
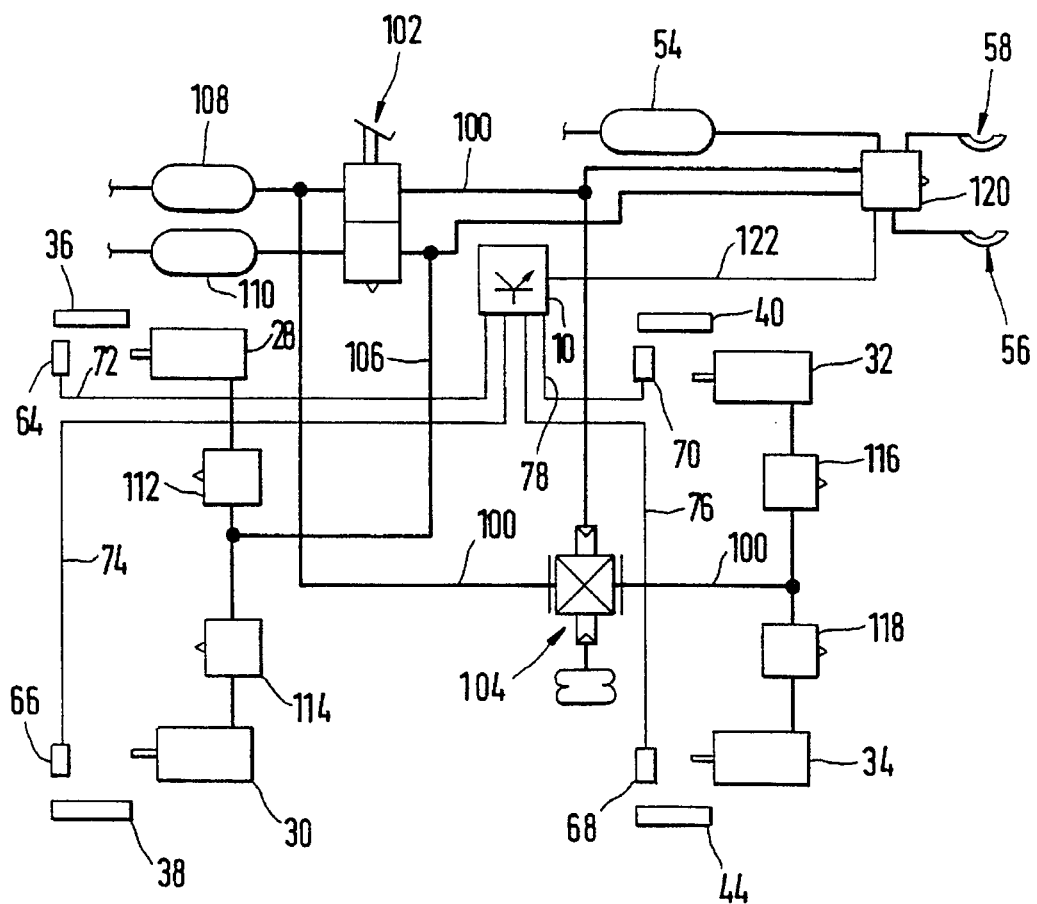

Here, the elements already described with reference to FIG. 1a are provided with the same references. A double circuit brake system is illustrated in FIG. 1b. In a first, preferably pneumatic, brake circuit 100 which is provided with a reservoir vessel 108, the service brake valve 102 controls the brake pressure in the brake cylinders 32 and 34 of the rear axle via an axle-load-dependent braking force adjuster 104. In a second brake circuit 106, which is also preferably pneumatic and is provided with a reservoir vessel 110, the pressure in the wheel brake cylinders 28 and 30 of the front axle of the towing vehicle is controlled as a function of the activation of the service brake valve 102. Pressure control valves 112, 114, 116 and 118 which can be activated electrically and which modulate the pressure fed into the wheel brake cylinder by the electronic control unit 10 for the purpose of ABS control are assigned to the wheel brake cylinders 28, 30, 32 and 34 via actuation lines (not illustrated). Reservoir pressure is fed to the trailer from the reservoir vessel 58 via a further pressure control module 120 and the coupling head 58, and the pneumatic brake signals of the two brake circuits are fed via the coupling head 56. An actuation line 122 leads from the control unit 10 to the pressure control module 120 by means of which the electronic control unit influences the pneumatic brake signal (pressure) fed to the trailer, in accordance with the procedure according to the invention for minimizing or reducing the longitudinal forces during the braking process. For this purpose, the electronic control unit 10 prescribes a desired pressure, corrected in accordance with the procedure according to the invention, for the pneumatic brake signal, which desired pressure is fed by the pressure control module 120 within a pressure control circuit.

Figure 2A:
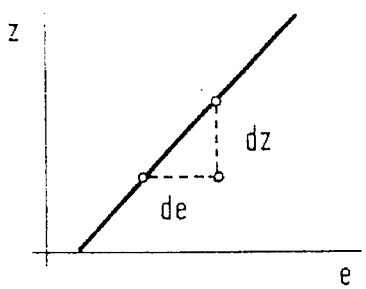
FIG. 2$a$ illustrates the increase in braking z which occurs with an increase in the brake signal e.

If a truck with a trailer is braked, in the brake systems described, a brake signal e is transmitted from the towing vehicle to the trailer. At the same time, the towing vehicle is braked with the braking force B1 of the brake system of the towing vehicle and the trailer is braked with the braking force B2 of the brake system of the trailer. The road train which is coupled together is accordingly braked by the sum of these braking forces (B1+B2). The objective of the control or adjustment of the brake system of such a train is that the towing vehicle and the trailer achieve a prescribed braking z given a defined brake signal e. Here, the z designates the ratio of force b to the weight g of the road train or, after conversion, the ratio of the deceleration b to the acceleration g of the earth. A defined assignment of the brake signal e to the z is illustrated in FIG. 2a. The increase in the brake signal by the value de, shown by way of example, accordingly leads to an increase in the braking by the value dz.

If the two individual vehicles, towing vehicle and trailer, were each to comply with the same assignment of brake signal and deceleration, the braking of the vehicle which is coupled together would also be as illustrated in FIG. 2a. This means that, when the vehicle is coupled together, the change de in the brake signal entails a change in the deceleration by dz.

Figure 2B:
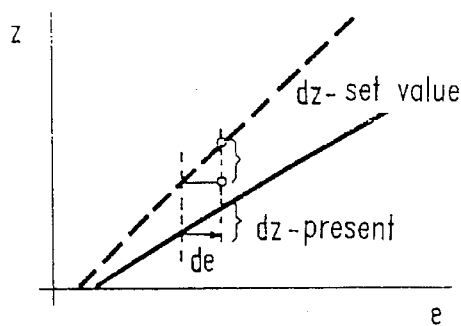

In reality, this ideal state hardly occurs. Here, the braking effects of the towing vehicle and trailer (cf. FIG. 2b) differ. The characteristic braking curve of the towing vehicle (illustrated by a broken lines in FIG. 2b) is essentially prescribed by the configuration of the brake system and the weight of the vehicle. In an ideal case, the entire road train should have this characteristic deceleration curve. In the case of a change in the brake signal e by the factor de, a change in the deceleration z or in the deceleration b according to the prescribed characteristic curve by the factor dz-set value is to be expected. In reality, the trailer mass to be braked, as an individual vehicle, does not reach this ideal assignment. The deceleration of the braked mass of the trailer deviates from that prescribed. The entire vehicle therefore exhibits the unbroken characteristic deceleration curve in FIG. 2b. A change in the brake signal e by the value de does not lead to a change in the deceleration by the value dz-set value but rather, in the example given in FIG. 2b, to a smaller deceleration dz-present. As a result of the different deceleration characteristic of towing vehicle and trailer, undesired coupling forces occur between the two parts of the vehicle, the reduction or minimization of which coupling forces signifies a considerable improvement in the braking process. The cause of the different characteristic deceleration curves is, in particular, the different tuning of brakes of various vehicle manufacturers, in load changes (weight) or in fluctuations in coefficients of friction of the wheel brakes.

In the control unit 10 of the towing vehicle, at least one experimentally determined characteristic desired deceleration curve is prescribed. In the simplest case, the relationship is described by means of a linear characteristic curve. In other exemplary embodiments, this characteristic curve can also have other functional relationships. In a particularly advantageous exemplary embodiment, a characteristic diagram is provided in which different characteristic desired deceleration curves are stored as a function of the loading of the vehicle (axle load), the travel resistance (speed), the state of the brakes (residual thickness of brake linings) and/or the road conditions (coefficient of friction, positive/ negative gradient).

Figure 2C:
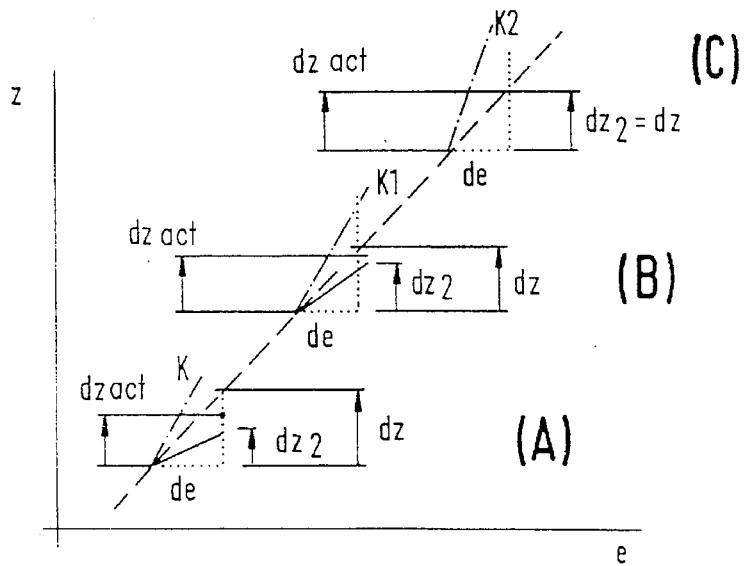
Figure 2D:
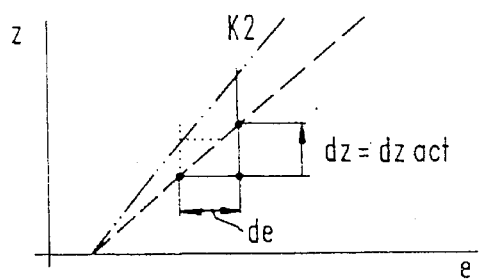

According to the invention, the deceleration sequence of the trailer is matched to that of the towing vehicle, so that, in an ideal case, the deceleration of the entire road train corresponds to that of the towing vehicle. This leads automatically to a minimization of the longitudinal forces during the braking process. The method according to the invention is outlined by means of the relationships illustrated in FIG. 2c. It is assumed here that the towing vehicle has the linear deceleration sequence illustrated by broken lines. This deceleration sequence is prescribed. During the braking process, at a first operating point (A), it is assumed that the towing vehicle and trailer have the prescribed deceleration sequence. Therefore, when the brake signal changes by de, a change in the deceleration of the entire road train by dz is expected. Since, as a rule, the trailer has an assignment which deviates from the prescribed assignment (cf. FIG. 2c, the unbroken partial characteristic curves shown for the operating points A, B or C) and, in the case of a change in the brake signal e by de, leads to a change in the deceleration by $dz_2$, the entire road train is only braked by $dz_{act}$ when the brake signal e changes by the factor de. A correction factor K1 for the brake signal which is fed to the trailer can now be identified from the prescribed deceleration and the actual deceleration identified from the rotational speed signals of the wheels, the brake signal correcting the adjustment or control of the brakes of the trailer in such a way that, at the corresponding operating point, the entire road train achieves the prescribed deceleration dz when the brake signal changes by de. The outputting of the brake signal e to the trailer is corrected by the factor K1 (operating point B), when there is a subsequent change in pressure, while the towing vehicle continues to be braked on the basis of the original brake signal e. If the deceleration at the operating point B no longer corresponds to deceleration the set value dz, the correction factor is calculated again (K2) and the brake signal e to the trailer is corrected when there is a further increase in pressure (operating point C). If the desired deceleration is achieved during the correction by K2, this correction factor serves for future braking with a linear braking behavior. If the braking deviates from the desired behavior, the correction factor is determined again. This is illustrated in FIG. 2d. Here, the correction factor K2 has the result that, in the case of a deceleration process, the deceleration of the road train does not deviate from the desired deceleration so that the prescribed characteristic deceleration curve of the towing vehicle applies for the entire road train. This is achieved by means of a correction of the characteristic deceleration curve of the trailer (cf. FIG. 2d, chain-dotted lines) without data of the trailer being present. By adapting the characteristic deceleration curves of the towing vehicle and trailer, the longitudinal forces are minimized during the braking process and the braking process is optimized. Here, costly sensing of the coupling force between the towing vehicle and trailer can be dispensed with.

This procedure can be carried out for all operating points, i.e. for each brake signal e. Thus, different correction factors (K1, K2) are obtained at the different operating points A, B and C. The significance of this for the brake system of the trailer is that the characteristic deceleration curve is corrected at each operating point.

The described correction takes place here over the entire brake signal range. Therefore, the appropriate correction factor can be identified for each brake signal value, so that the characteristic deceleration curve of the trailer can be identified adaptively for each operating point of the brake system. In addition, in an advantageous exemplary embodiment, the correction is not only carried out for each brake signal value, or for selected sampling points of the brake signal value but rather also for various values of the axle load, the speed and/or the state of the roadway. The result is an adaptive characteristic diagram which is used to adapt the deceleration of the trailer in every operating state to the deceleration behavior of the towing vehicle.

The adaptively identified correction values can be used here for a plurality of braking operations. A subsequent braking operation can start from the last correction value. A new adaptation of the correction values may be required here after relatively long stationary times because, in the meantime, essential variables may have changed (for example, the mass of the trailer or the coefficients of friction of the wheel brakes). The identified correction values are, advantageously, stored permanently. If the system operates in one or other exemplary embodiment with a volatile memory, whenever the vehicle is started again the adaptation process is repeated, the procedure starting from prescribed start correction values (preferably from the value 1). It is particularly advantageous that, with the procedure according to the invention, no information whatsoever is necessary from the trailer. Therefore, this method can also be used particularly advantageously if a towing vehicle is operated with different trailers. Here, it is irrelevant for the execution of the method whether the trailer has an electrically adjusted brake system or a conventional pneumatic or hydraulic brake system.

The method according to the invention has particular advantages since the displacement, which is dependent on the axle load, of the characteristic deceleration curve in the towing vehicle can be taken into account during the adaptation of the characteristic deceleration curves. For this purpose, the axle load in the towing vehicle is detected by means of a corresponding sensor or sensors, and the characteristic deceleration curve of the towing vehicle, the prescribed characteristic deceleration curve, is changed in accordance with predetermined dependencies. Correspondingly, the characteristic deceleration curve of the trailer is adapted to the prescribed characteristic curve which is dependent on the axle load. Changes in coefficients of friction in the brake system of the towing vehicle are taken into account by correction of the characteristic deceleration curve of the trailer.

Depending on the configuration of the brake system, various physical variables are used as brake signal e. In a preferred exemplary embodiment, the electrical brake signal e represents a measure of the driver's wishes which are identified from the degree of activation or the activation force of the brake value sensor 14. In other advantageous exemplary embodiments, the electronic control unit 10 outputs a desired brake pressure or a desired braking torque or force to the trailer, so that this desired value forms the brake signal e. In a conventionally braked trailer, the brake signal e represents the pneumatic or hydraulic pressure of the service brake valve or the pneumatic brake signal output via the coupling head 56. In the case of electrical brakes, the brake signal e may be a desired current which is fed to the wheel brakes.

The procedure according to the invention is advantageously used in conjunction with pneumatic, hydraulic or electrical brake systems.

Figure 3:
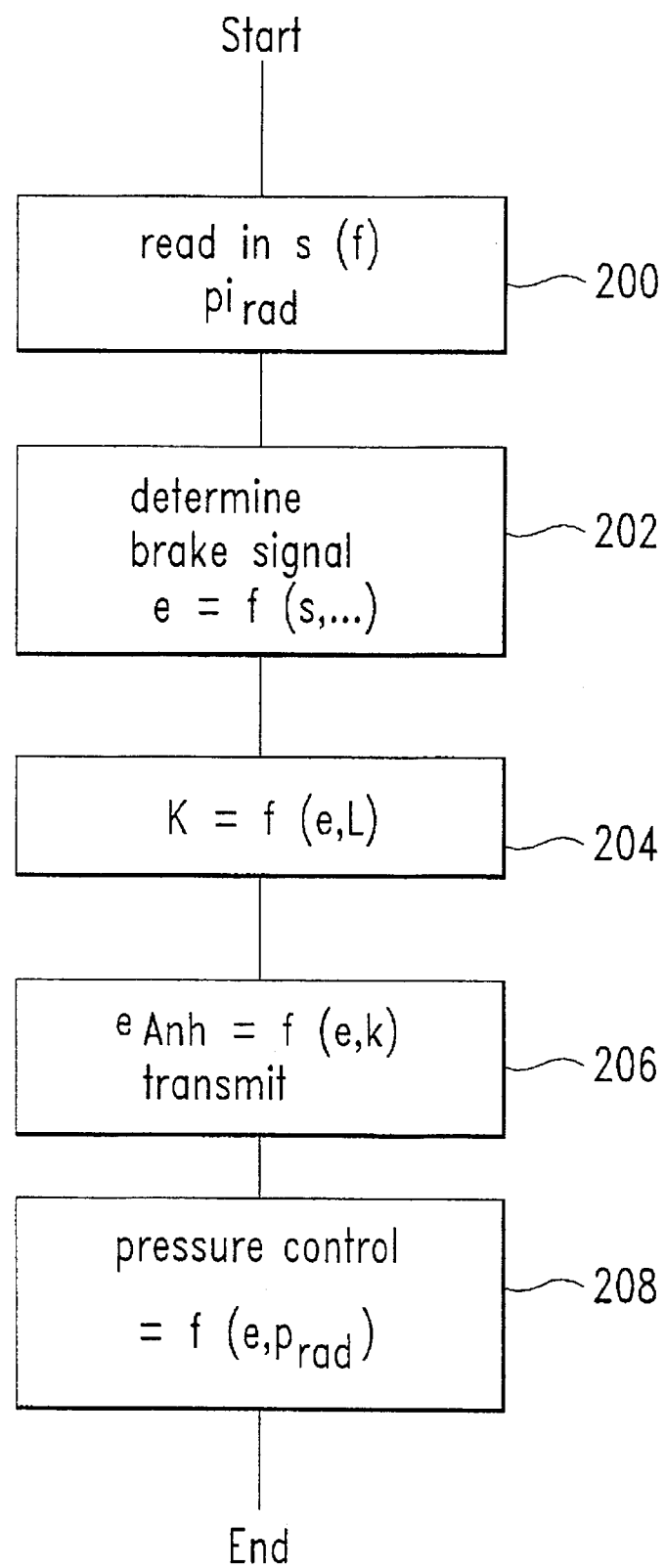
FIG. 3 is a flow diagram illustrating the control of brake pressure in the towing vehicle.
Figure 4:
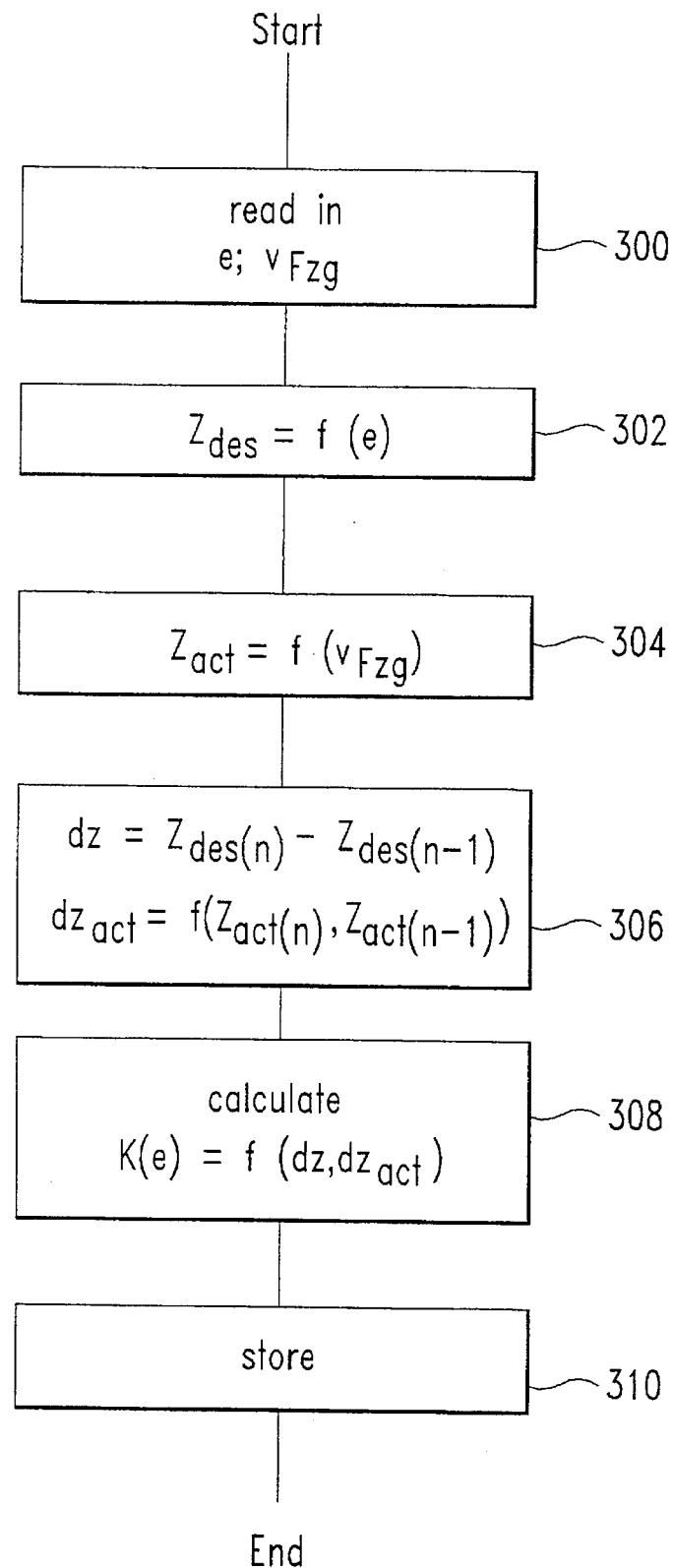
FIG. 4 is a flow diagram illustrating the determination of correction factors.

In FIGS. 3 and 4, the implementation of the procedure according to the invention as a computing program in the microcomputer of the electronic control unit 10 is clarified by means of flow diagrams. The basic principle of the procedure according to the invention is equating the deceleration of trailers to the deceleration of towing vehicles by means of a correction method in which the necessary correction values are determined adaptively. Here, in the preferred exemplary embodiment, the positive gradient of the characteristic deceleration curve is corrected, so that the characteristic deceleration curve of the entire vehicle is adapted to the characteristic deceleration curve of the towing vehicle. For this purpose, the desired change in the deceleration x in the towing vehicle is determined from the configuration characteristic (deceleration assignment, characteristic deceleration curve) and the axle load signals for each individual load state of the towing vehicle.

In FIGS. 3 and 4, the procedure according to the invention is illustrated by means of the preferred exemplary embodiment of a pressure-controlled brake system. In an analogous way, the procedure according to the invention is also identified in conjunction with an adjustment of the braking torque or the braking force.

After the start, at prescribed times, of the program part illustrated in FIG. 3, in the first step 200 the degree of activation s or the activation force f of the brake value sensor 14 and the pressures $pi_{rad}$ are read into the individual wheel brakes. Subsequently, in step 202, the brake signal e is determined on the basis of the degree of activation s or the activation force f. In the preferred exemplary embodiment, this is a matter of desired pressure values which are determined on the basis of adapted characteristic curves for each wheel brake of the towing vehicle and for the brake system of the trailer. In the following step 204, the correction factor K determined at the respective operating point of the brake system is read out, on the basis of the brake signal e and the axle load L of the towing vehicle, from stored, adaptively determined characteristic curves or characteristic diagrams or tables. In the following step 206, the brake signal for the trailer is determined, preferably by multiplication, on the basis of the brake signal and of the correction factor determined in step 204 and is transmitted to the trailer. Subsequently, in step 208, the pressure control of the brake system is carried out in the towing vehicle on the basis of the brake signal and the pressures in the individual wheel brakes. Then, the program part is terminated and repeated at a given time.

The program part according to FIG. 4 is provided for determining the correction factors. Said program part is started when the brake pedal is activated at the prescribed times. In a preferred exemplary embodiment there is provision for the start of the program part to be initiated only after a prescribed stationary time since, during a relatively long stationary period, the properties of the wheel brakes have changed or another trailer has been coupled onto the towing vehicle. The stationary time is identified here from the time for which the wheel speeds are zero, if appropriate with the ignition switch opened. In other advantageous exemplary embodiments, the program part is initiated only in the case of an activation of the brake pedal (positive temporal derivation of the activation signal ) and/or release of the brake pedal (negative temporal derivation). In order to determine the correction factors, in the first step 300 the brake signal e and the vehicle speed $V_{Fzg}$ formed from the wheel speeds are read in. Subsequently, in step 302, the desired deceleration value $z_{des}$ is determined on the basis of the brake signal by means of the prescribed characteristic deceleration curve of the towing vehicle, if appropriate in a load-dependent manner. The actual deceleration $z_{act}$ of the entire road train is identified (cf. step 304) from the vehicle speed, in particular by forming the temporal derivation. Subsequently, in step 306, the change in deceleration dz is identified from the currently identified set deceleration value and the desired set value identified at a previous time. Correspondingly, the actual change in deceleration $dz_{act}$ is identified on the basis of the identified actual deceleration value and a previous value of the actual deceleration during the same braking process. Subsequently, in step 308, the correction factor K, valid for the current operating point, is formed on the basis of the desired deceleration dz and the actual deceleration $dz_{act}$. This takes place in the preferred exemplary embodiment in that the correction factor K is prescribed as a quotient of the two values since the correction factor K is taken into account during the determination of the brake signal for the trailer within the scope of a multiplication. Here, it is possible, as illustrated in FIG. 2, not only for a relatively small change in the deceleration to arise as a result of the trailer, but also for a relatively large change to arise in comparison with the desired set value. In the latter case, the correction factor is smaller than 1, in the first case it is greater than 1. After the brake-signal-dependent and load-dependent correction factor is determined, the correction factor is preferably permanently stored in step 310 and the program part is terminated.

I claim:

1. Method for braking a towing vehicle and a trailer towed by said towing vehicle, said method comprising:

generating a brake signal (e) for said towing vehicle in response to a driver's action, generating a brake signal (eTr) for said trailer in dependence on said brake signal (e) for said towing vehicle;

generating a prescribed deceleration (Zdes) for said towing vehicle in dependence on said brake signal (e) for said towing vehicle, generating an actual deceleration (Zact) for the whole vehicle (towing vehicle and trailer), generating a correction value K for the brake signal (eTr) for the trailer during braking in dependence on said prescribed deceleration (Zdes) and the actual deceleration (Zact), correcting the brake signal (eTr) for the trailer during braking by the correction value K, whereby said actual deceleration (Zact) substantially equals to said prescribed deceleration (Zdes), applying brake pressure at the towing vehicle and the trailer based on the respective brake signals.

2. Method as in claim 1 further comprising determining an axle load (L) of the towing vehicle, said prescribed deceleration (Zdes) being generated in dependence on said axle load (L) and the brake signal (e) for the towing vehicle.

3. Method as in claim 2 further comprising determining at least one variable representing the state of the towing vehicle, said prescribed deceleration (Zdes) being generated in further dependence on said at least one variable representing the state of the towing vehicle.

4. Method as in claim 2 further comprising determining at least one variable representing the state of the road, said prescribed deceleration (Zdes) being generated in further dependence on said at least one variable representing the state of the road.

5. Method as in claim 1 wherein the dependence of said prescribed deceleration (Zdes) on said brake signal (e) is represented as a characteristic deceleration curve having a positive gradient, the correction value (K) being generated by changing the gradient in dependence upon the actual deceleration (Zact).

6. Method as in claim 1 wherein said correction values (K) are stored as a characteristic curve which is a function of said brake signal (e).

7. Method as in claim 6 further comprising determining an axle load (L) of the towing vehicle, said characteristic curve being a further function of said axle load (L).

8. Method as in claim 6 further comprising determining at least one variable representing the state of the towing vehicle, said characteristic curve being a further function of said at least one variable representing the state of the towing vehicle.

9. Method as in claim 6 further comprising determining at least one variable representing the state of the road, said characteristic curve being a further function of said at least one variable representing the state of the road.

10. Method as in claim 1 wherein said brake signal (e) is one of an electrical signal, a desired pressure value, a desired braking torque value, and desired braking force value.

11. Method as in claim 1 wherein said brake signal (e) is a pneumatic or hydraulic pressure signal which is fed to said trailer.

12. Method as in claim 1 wherein said correction value is generated only after the whole vehicle has been stationary for a prescribed time.

13. Apparatus for braking a towing vehicle and a trailer towed by said towing vehicle, said apparatus comprising means for generating a brake signal (e) for said towing vehicle and a brake signal (eTr) for said trailer in dependence on a driver's brake application, means for generating a prescribed deceleration (Zdes) for said towing vehicle in dependence on said braking signal (e) for the towing vehicle, means for determining an actual deceleration (Zact) for the whole vehicle (towing vehicle and trailer), means for generating a correction value (K) for the brake signal (eTr) for the trailer, whereby said actual deceleration (Zact) substantially equals said prescribed deceleration (Zdes), and means for operating the brakes at the towing vehicle and the trailer in response to said signals (e) and (eTr).

14. Apparatus as in claim 13 wherein said trailer has a conventional pneumatic or hydraulic brake system, said signal (eTr) adjusting the brake pressure at the trailer so that the deceleration (Zact) of the trailer equals the desired deceleration (Zdes) of the towing vehicle.

* * * * *

UNITED STATES PATENT AND TRADEMARK OFFICE
CERTIFICATE OF CORRECTION

PATENT NO. : 5,588,716

DATED : December 31, 1996

INVENTOR(S) : Stumpe

Page 1 of 2

It is certified that error appears in the above-identified patent and that said Letters Patent is hereby corrected as shown below:

In column 2, line 54, before "pressure" delete -- : --.

In column 4, line 8, before the first occurrence of "z" delete -- braking --.

In column 4, line 9, before "force" insert -- braking --.

In column 5, line 29, after "to" delete -- deceleration --.

In column 5, line 35, in both occurrences change "braking" to -- deceleration --.

In column 5, line 38, before "process" change "deceleration" to -- braking --.

In column 7, line 5, change "x" to -- dx --.

UNITED STATES PATENT AND TRADEMARK OFFICE
CERTIFICATE OF CORRECTION

PATENT NO. : 5,588,716
DATED : December 31, 1996
INVENTOR(S) : Stumpe

It is certified that error appears in the above-identified patent and that said Letters Patent is hereby corrected as shown below:

In Claim 1, column 8, lines 38-39, after "equals" delete -- to --; and after "(Zdes)", insert -- and --.

Signed and Sealed this

Twenty-seventh Day of July, 1999

Attest:

Q. TODD DICKINSON

*Attesting Officer*  *Acting Commissioner of Patents and Trademarks*